US007529250B2

(12) United States Patent
Pedersen

(10) Patent No.: US 7,529,250 B2
(45) Date of Patent: May 5, 2009

(54) ADAPTIVE ETHERNET SWITCH SYSTEM AND METHOD

(75) Inventor: Michael Junge Pedersen, Ingaro (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 752 days.

(21) Appl. No.: 10/501,517

(22) PCT Filed: Jan. 14, 2003

(86) PCT No.: PCT/SE03/00036

§ 371 (c)(1),
(2), (4) Date: Nov. 5, 2004

(87) PCT Pub. No.: WO03/063425

PCT Pub. Date: Jul. 31, 2003

(65) Prior Publication Data

US 2005/0063391 A1 Mar. 24, 2005

(30) Foreign Application Priority Data

Jan. 18, 2002 (SE) .................................. 0200180

(51) Int. Cl.
*H04L 12/28* (2006.01)
(52) U.S. Cl. ................................. 370/395.21
(58) Field of Classification Search ......... 370/229–236, 370/395.2–395.53, 468; 709/223–237
See application file for complete search history.

(56) References Cited

U.S. PATENT DOCUMENTS 6,363,053 B1 * 3/2002 Schuster et al. ............. 370/230
6,490,252 B1 * 12/2002 Riggan et al. ............... 370/237
2002/0105909 A1 * 8/2002 Flanagan et al. ............ 370/230

FOREIGN PATENT DOCUMENTS

| EP | 1146704 A2 | 10/2001 |
| WO | WO9965196 | 12/1999 |
| WO | WO0003521 A1 | 1/2000 |
| WO | WO0079830 A1 | 12/2000 |
| WO | WO0131969 A1 | 5/2001 |

OTHER PUBLICATIONS

Swedish Patent Office, International Search Report for PCT/SE03/00036, dated Apr. 14, 2003.

* cited by examiner

*Primary Examiner*—Chirag G Shah
*Assistant Examiner*—Otis L Thompson, Jr.
(74) *Attorney, Agent, or Firm*—Thomas Bethea, Jr.

(57) ABSTRACT

The invention relates to switch based aggregation system, method and computer program product for providing Quality of Service (QoS) to a layer 2 configured network comprising a connection oriented switching means connected to a Wide Area Network (WAN). The system comprises an Adaptive Quality of Service (AQS) means connected to said switching means. The Adaptive Quality of Service (AQS) means comprises monitoring means for monitoring the total IP data throughput stream and the RTCP reports in the system, filtering means being capable of filtering the total IP data throughput stream and controlling means for controlling said filtering means depending on the monitoring of the total IP data throughput stream and adaptable filter criteria.

10 Claims, 8 Drawing Sheets

| Ver | Pad | RC | PT | Length |
|---|---|---|---|---|
| SSRC of Sender ||||||
| NTP Timestamp, Most Significant Word |||||
| NTP Timestamp, Least Significant Word |||||
| RTP Timestamp |||||
| Sender's packet count |||||
| Sender's octet count |||||

Fig. 3a

| Ver | Pad | RC | PT | Length |
|---|---|---|---|---|
| SSRC of Sender |||||
| SSRC-1 (SSRC of first source) |||||
| Fraction Lost || Cumulative # of Packets Loss |||
| Extended Highest Sequence Number Received |||||
| Interarrival Jitter |||||
| Last SR (LSR) |||||
| Delay Since Last SR (DLSR) |||||

Fig. 3b

ADAPTIVE ETHERNET SWITCH SYSTEM AND METHOD

TECHNICAL FIELD

The present invention relates to a system, a method and a computer program product for enabling a network having an Ethernet switch to support Quality of Service.

In more detail, the present invention relates to a switch based aggregation system, a method and a computer program product for providing Quality of Service (QoS) to a network comprising a connection oriented switching means for IP layer 3 based traffic.

BACKGROUND OF THE INVENTION

Internet comprises an enormous number of different networks interconnected by computers. Internetworking implies that the interconnected systems agree to conventions that allow each computer to communicate with every other computer. In particular, an internet will allow two machines to communicate even if the communication path between them passes across a network to which neither connects directly. Such cooperation is only possible when computers agree on a set of universal identifiers and a set of procedures for moving data to its final destination.

In an internet, interconnections among networks are formed by computers called IP routers, or IP gateways, that attach to two or more networks. A gateway forwards packets between networks by receiving them from one network and sending them to another.

Data communications are often conducted over data-based networks, such as those based on the Internet Protocol. Asynchronous data transfer technologies, like ATM (Asynchronous Transfer Mode), is commonly used as layer 2. ATM is a connection-oriented network technology that uses small, fixed-size cells at the lowest layer. It has the potential advantage of being able to support voice, video and data with a single underlying technology.

However, the Internet is quickly changing from an asynchronous data transfer conduit to a multimedia backbone. Continuous media applications, such as audio or video conferencing, Internet radio, on-line seminars, or Video-on-Demand system, are becoming commonplace. These applications transmit data at regular intervals and require strict guarantees on maximum delay and minimum bandwidth. Users accustomed to the high bandwidth provided by fixed network connections as well as other multimedia services. As they move to wireless devices, they will expect similar services even when connected via low-bandwidth wireless connections.

At the transport layer, the Real Time Transport Protocol (RTP) is used to support multimedia traffic on the Internet. Some of the benefits of using RTP are that it does not require changes to existing routers and gateways, it may be implemented on top of the User Datagram Protocol (UDP/IP) or ATM, and it takes advantage of the multimedia backbone, which allows bandwidth-efficient distribution of data to many users by eliminating redundant packet transmissions.

RTP has been designed within the Internet Engineering Task Force (IETF). Note that the moniker "transport protocol" could be misleading, as it is currently mostly used together with UDP, also designated as a transport protocol. RTP is an end-to-end protocol. RTP consists of two parts, a data part and a control part. Continuous media data like audio and video is carried in RTP data packets.

RTP offers a control protocol called RTCP that supports the protocol functionality. An RTP message consists of a number of "stackable" packets, each with its own type code and length indication. Their format is fairly similar to data packets; in particular, the type indication is at the same location. RTCP packets are multicast periodically to the same multicast group as data packets. Thus, they also serve as a liveness indicator of session members, even in absence of transmitting media data.

RTCP packets contain the necessary information for Quality-of-Service (QoS) monitoring. If they are multicast, all session members can survey how the other participants are faring. Applications that have recently sent audio or video data generate a sender report. It contains information useful for intermedia synchronisation as well as cumulative counters for packets and bytes sent. These allow receivers to estimate the actual data rate. Session members issue receiver reports for all video and data audio sources they have heard from recently. They contain information on the highest sequence number received, the number of packets lost, a measure of the interarrival jitter and timestamps needed to compute an estimate of the roundtrip delay between sender and the receiver issuing the report.

The receiving end applications deliver Receiver Reports to the source. The reports include information that enables the calculation of packet losses and packet delay jitter. There are two reasons for packet loss: packets get lost due to buffer overflow or to bit errors. The probability of bit errors is very low on most networks. It is already considered in the TCP protocol that loss is rather induced by congestion than by bit errors. Buffer overflow can happen on a congested link or at the network interface of the end device.

Document WO 0079830, A1, discloses a telecommunication system giving the option to a user (A1) to select desired services delivered via a service network from service providers. One of the problem addressed in this document is how to guarantee the services a transmission quality. This is solved by giving the services a priority corresponding to the need they have for transmission in real time. Two types of priority fields in the data packets are discussed: CoS, i.e. Class of Service, which is a field in the link level (layer 4), and ToS, i.e. Type of Service, which is a field in the Internet level (layer 3). The priority method is discussed in more detail from line 6 of page 10 to line 34 of page 13.

Document WO 0131969, A1, discloses an Ethernet-type edge switch that interfaces a cell-based (ATM) network, which transport multimedia information. A system providing end-to-end Quality of Service in ATM systems is presented. A CIF shim layer is employed to manage the transmission of all traffic according to the Quality of Service specified for each traffic stream (see line 20 of page 18-line 20 of page 19).

Document WO 0003521, A1, discloses a middleware-based real-time communication system. The nodes of the present Ethernet network comprises an application layer, a Middleware Real Time Ethernet (MRTE) layer and an Ethernet Protocol layer. The MRTE layer logically comprises a pair of queues for data traffic or packets generated in the application layer for transmission to another node. The first queue comprises a real time queue for queuing information packets that have been accepted for transmission on a real time basis. The real time traffic has been sorted by criticality and is guaranteed to be sent without collision. The second queue comprises a non-real time queue for data packets that do not need to arrive at a destination in real time to be of value to the receiving node. This queue is sorted by first in, first out. The MRTE layer is further divided into QoS adaptation services and deterministic scheduling services. The QoS adaptation services contains a QoS manager and a QoS adaption algorithm.

The QoS manager and its associated QoS adaptation algorithm provide QoS-based negotiation and adaptation services such as changing the duration of non-real-time data traffic or suspending low-criticality traffic to ensure that sufficient collision free bandwidth is provided for high priority real time traffic. Deterministic scheduling services contains a collision resolution protocol, an MRTE protocol and an MRTE scheduler and its associated scheduling algorithm and MRTE repository. The deterministic scheduling algorithm controls the flow of communication with the QoS manager, which further controls the flow of communication with the applications and the QoS adaption algorithm (see line 34 of page 7 to line 21 of page 8 and line 24 of page 10 to line 15 of page 14).

Document EP 1 146 704, A2, discloses a system and method for providing an intermediary layer for VOIP call pipe establishment. A Generate QoSEthernet layer is provided, interposed between an IP protocol voice communication layer and the QoSEthernet layer. The Generate QoSEthernet layer intercepts call commands, such as set up call commands, and identifies a required QoS for the particular call (see section [0026]).

Document WO 9965196, A1, discloses a local area network (LAN) comprising a communication switching module. Said module controls flow of both delay-sensitive voice digital voice signals from digital telephones and non-delay-sensitive user data from PC's. The module is connected to a WAN. The Ethernet LAN employs a Constant Bit Rate Channel.

Numerous problems may occur for many applications, when QoS is not controlled.

One problem, for example, will arise when the media stream arrives to a network not supporting the QoS feature. The switches of the network may be of Ethernet Layer 2 kind or ATM offering connection oriented service. There is no possibility for giving selective priority, like precedence, to different IP data packages. Quality of Service (QoS) on IP-level layer 3 is therefore not provided for.

A solution is needed when applications based on IP require priority, due to Quality of Service, from a WAN based on a narrow band network access technology like Cable TV (CaTV), xDSL (various DSL systems [Digital Subscriber Line], e.g. Asymmetric DSL), or Wireless Networks like Wireless Local Area Networks (WLAN), 802.11b or Fixed Wireless Access (FWA) technology.

SUMMARY

One object of the present invention is to solve the above-mentioned problem.

Further one object of the present invention is to provide Quality of Service (QoS) to a layer 2 configured network comprising a connection oriented switching means.

Moreover, one object of the present invention is to provide Quality of Service (QoS) by making it possible to give selective priority, like precedence, to IP data packages of real time applications or services over none real time applications or services, different IP data packages addressed to a certain end-user or to ports belonging to one MAC-address, IP-address, session-ID or similar.

Said objects are obtained by the invented switch based aggregation system, method and computer program product for providing Quality of Service (QoS) to a layer 2 configured network comprising a connection oriented switching means connected to a Wide Area Network (WAN) having at least one clearly bandwidth restricted channel, like an Constant Bite Rate (CBR) channel, wherein voice-, video- and/or other real time applications or services together with none real time applications or services are provided over an Internet Protocol (IP), wherein said system comprises an Adaptive Quality of Service (AQS) means connected to said switching means. The Adaptive Quality of Service (AQS) means comprises, monitoring means for monitoring the total IP data throughput stream and the RTCP reports in the system, filtering means being capable of filtering the total IP data throughput stream and controlling means for controlling said filtering means depending on the monitoring of the total IP data throughput stream and adaptable filter criteria.

In more detail, the present invention relates to method for providing Quality of Service (QoS) to an Ethernet switching means connected to a Wide Area Network (WAN), which has at least one bandwidth limited channel, wherein a total IP data throughput of voice-, video- and/or other real time applications or services together with none real time applications or services are provided by use of IP data packages, characterised in that the Ethernet switching means is logically connected to an Adaptive Quality of Service (AQS) means and that the method comprises following steps:

acquisition of the Quality of service information carried in the RTP/RTCP data packages;

comparing at least one QoS value $Q_n$, whereat each $Q_n$ is based on the Quality of service information from the RTP/RTCP data packages, to a corresponding QoS acceptance ratio;

filtering when at least one QoS value has an unacceptable level to said corresponding QoS acceptance ratio.

Further, the present invention relates to a system for providing Quality of Service (QoS) to an Ethernet switching means connected to a Wide Area Network (WAN), which has at least one bandwidth limited channel, wherein a total IP data throughput stream of voice-, video- and/or other real time applications or services together with none real time applications or services are provided by use of IP data packages, characterised in that, said Ethernet switching means is logically connected to an Adaptive Quality of Service (AQS) means that includes controlling means that control a filtering means, when a comparing means of a monitoring means indicates an unacceptable QoS level based upon the monitoring Quality of service information carried in RTP/RTCP data packages.

The present invention also relates to a computer program product directly loadable into an internal memory storage of a processing means within the controlling means, comprising the software code means for performing the steps of the claimed method.

One advantage is that the present solution offers the possibility to highly improve the QoS for IP based real time applications and services running over band networks that are currently not supporting Quality of Service on IP-level layer 3.

Further one advantage is that the encrypted data package traffic is not affected by this solution. The invention is transparent to encrypted data traffic.

Further one advantage is that the invention secures that an end user is guaranteed minimum available bandwidth, GMB, for real time services.

Also one advantage is that the invention provides cost effective processing, because it does not read the RTCP receiver reports until the total data throughput exceeds the minimum value.

Further one advantage is that the invention is based on and supports standardized communication configurations, such as ATM etc., in a new and inventive way to attain the wanted result.

Further one advantage is that the invention only allocates bandwidth when it is needed. In RSVP and CBR techniques, each user is always allocated bandwidth on a channel for a dedicated application. A better use of the available bandwidth of a channel is therefore provided by the invention.

Moreover, the invention is independent of any vendor provided narrow band network capability other than support for a guaranteed minimum throughput bandwidth GMB.

BRIEF DESCRIPTION OF THE DRAWINGS

The invention will better be understood by the following description and annexed drawings, wherein:

FIGS. 3a and 3b are illustrations of a sender report and a receiver report, respectively.

DETAILED DESCRIPTION OF THE INVENTION

The present invention relates to a system, a method and a computer program product for enabling a network to support Quality of Service.

The present invention is related to a switch based aggregation system connected between Wide Area Network (WAN) of any type and residential networks and end devices, that have no possibility to recognise the different kinds of incoming traffic, such as Internet surf, FTP download, non real time applications, voice, video and/or other real time applications etc.

Figure 1:
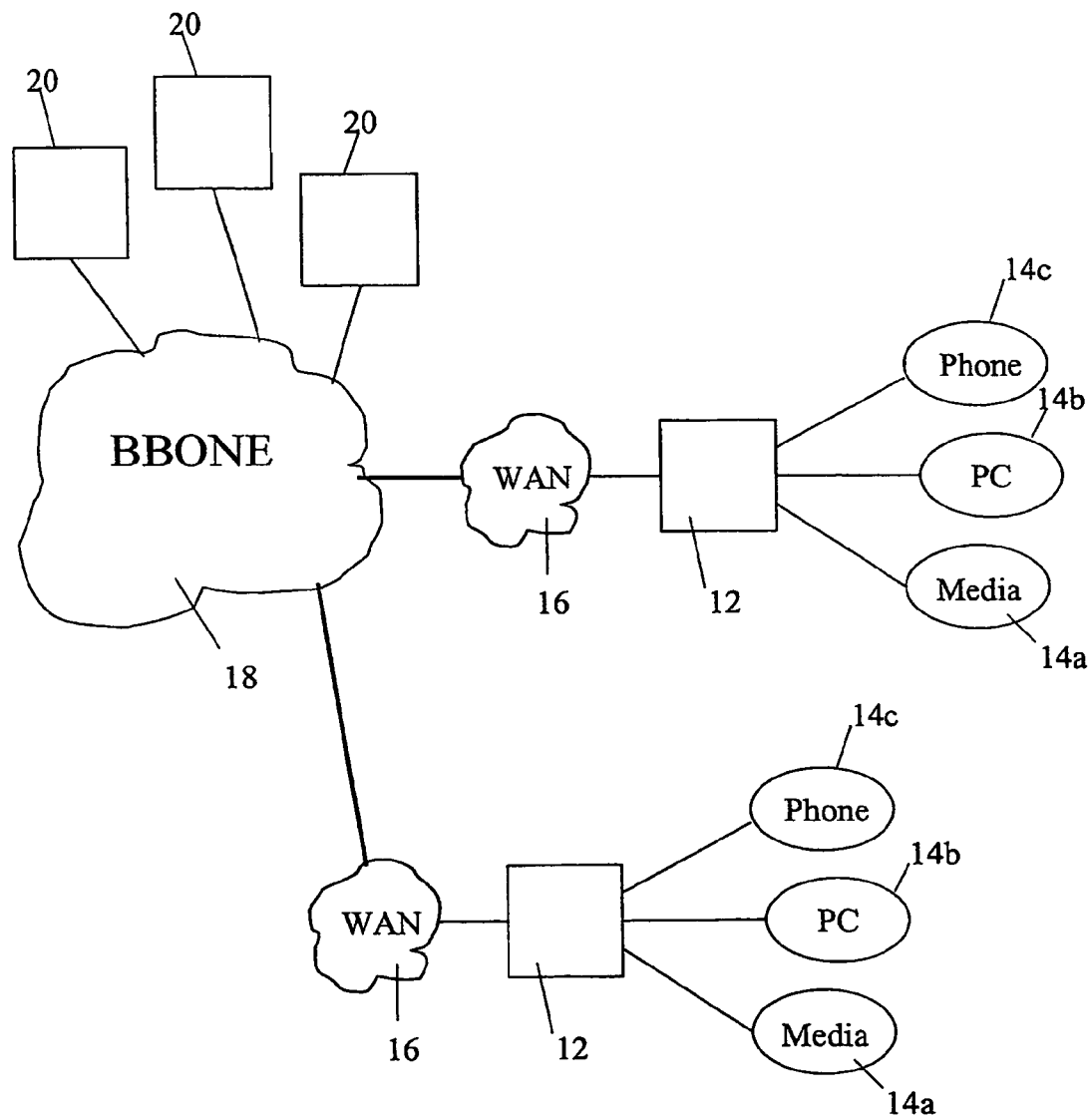
FIG. 1 is a block diagram of a packet switched network configuration.

FIG. 1 is a block diagram of a packet switched network configuration. A switch 12 is interconnected by a Wide Area Network (WAN) 16 to a Backbone network 18, wherein voice-, video- and/or other real time applications together with none real time applications are provided up- and down streams over an Internet Protocol (IP) or Multiprotocol Switching Label Switching (MPLS), ATM and Ethernet at Layer 2. The switch 12 is situated at a customer's/subscriber's/user's premise. A number of end devices 14a-c is connected to the network, each end device providing a special service/application to the customer. In FIG. 1, only three end devices are shown, a phone 14c for voice communication, a PC 14b for data communication and a media device 14a, for example a television set or other equipment for video communication, but a lot of other end devices for multimedia communication and services are possible to connect to the switch 12. The switch 12 is connected to a Wide Area Network (WAN) 16 that is connected to a Quality of Service enabled backbone 18. The backbone contains a lot of different servers 20 or service providers providing applications/services, such as, voice, video and data, and a network which routes the media streams to the right customers. In this case, the communication link is a WAN based on a bandwidth limited band network access technology like Cable TV (CaTV), XDSL (various DSL systems [Digital Subscriber Line], e.g. Asymmetric DSL) or Wireless Local Area Networks (WLAN).

To make the description concrete and relate to available hardware, Asynchronous Transfer Mode (ATM) will be used in the following example. ATM can be used for both local area and wide area networks, and supports a variety of applications including real-time audio and video as well as conventional data communication. However, the invention is not restricted to be combined with this end of communication technology, it is also applicable with other technologies.

The switch interconnects a WAN with a number of end devices, as described generally in FIG. 1. The end devices are connected to suitable ports, respectively, such as LAN ports or POTS (Plain Ordinary Telephone Service) ports.

The WAN, which is a bandwidth limited network, interconnects the switch and LAN with a Broadband Backbone network, like Internet. In this example, the WAN may comprise an ADSL modem connected to an ATM-switch, DSLAM. ATM provides a connection-oriented interface to attached hosts. The DSLAM switches the data packets and signalling traffic to the correct DSL (Digital Subscriber Line) of all the connected DSLs.

Some of these wide area networks, WANs, don't support any Quality of Service (QoS) on IP-level layer 3 and problems like saturation, package loss, jitter and delay may not be predictable and controllable. Since bandwidth is a scarce resource and sessions from subscribers become active and inactive asynchronously, bandwidth should be used only on demand. If the switching device 12 or access network does not have enough bandwidth handling capacity, the desired real time service session can not flow through the network meeting desired QoS requirements. There may be multiple application sessions or services co-existing simultaneously, and they can be set up and torn down asynchronously.

For the present system two conditions have to be fulfilled. A first condition is that at least one of the senders or receivers of real time media streams use a type of Gateway or end device that supports the RTP/RTCP protocol for the real time media transport.

A second condition is that the system a guaranteed minimum throughput in the WAN network, meaning that every user is guaranteed a minimum bandwidth through the access network.

According to the invention, any kind of signalling protocol, like H.323, MGCP, SIP, may be used for setting up a voice-over-IP call. For media streams RTP/RTCP is used.

Figure 2:
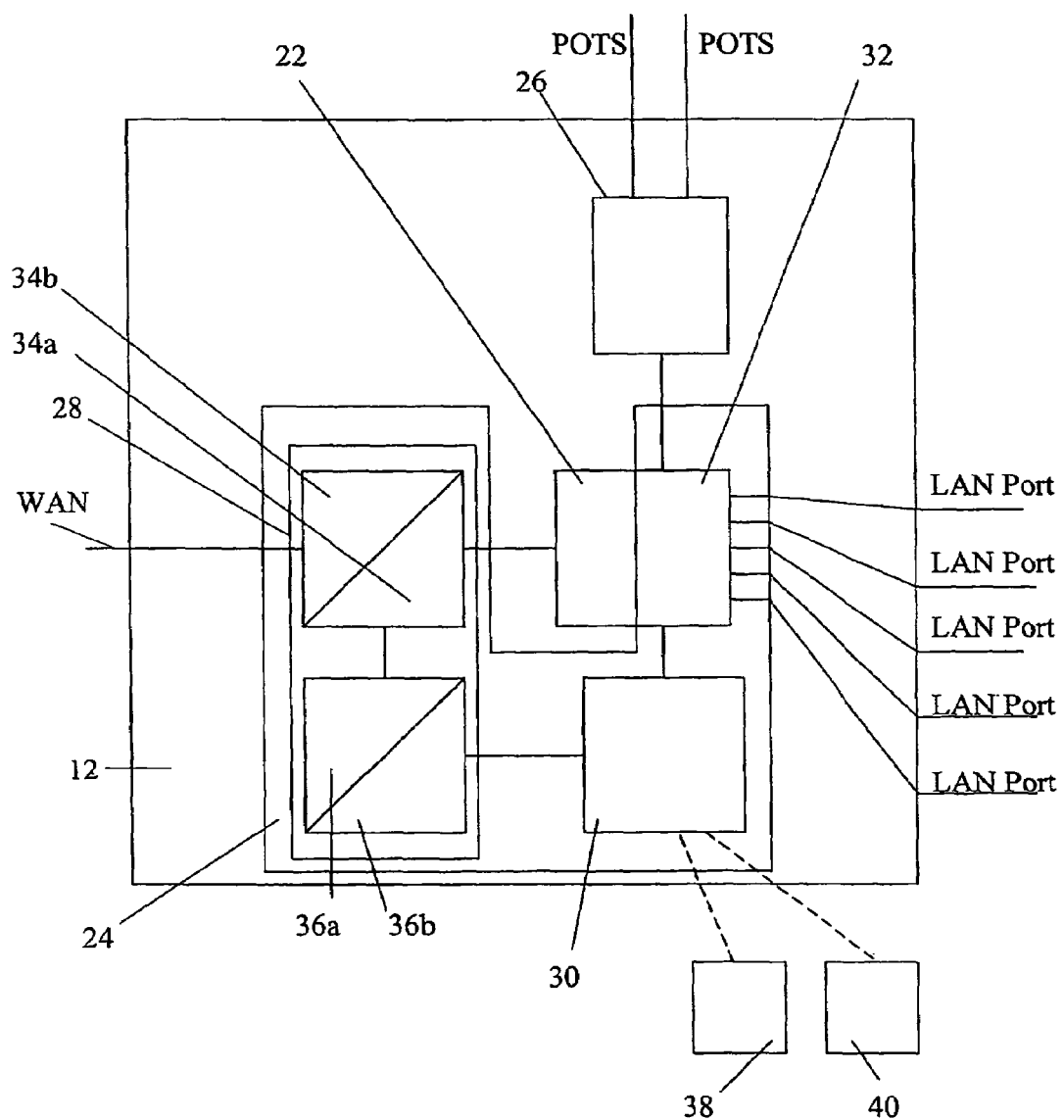
FIG. 2 is a block diagram illustrating a first embodiment of the invented switch based aggregation device.

FIG. 2 is a block diagram illustrating a first embodiment of the invented switch based aggregation system 12. The switch based aggregation system 12 is connectable to a Wide Area Network (WAN) 16 having at least one clearly limited bandwidth channel or Constant Bite Rate (CBR) channel, wherein voice-, video- and/or other real time applications or Services together with none real time applications or services are provided as data package streams over an Internet Protocol (IP). The system 12 has a number of ports for connecting the WAN to a number of end devices (14 in FIG. 1) through the system 12. From the WAN incoming, downstream, IP data package streams have to be connected to the correct port, and IP data package streams from the different ports have to be collected and transmitted upstream over the WAN. The end devices 14 generates data packages that are transmitted and transported up-streams.

According to a preferred embodiment of the invention, the switch based aggregation system 12 comprises a switching means 22 and an Adaptive QoS (AQS) means 24. In this embodiment is also a gateway 26 enclosed and integrated in the system construction.

The switching means 22 connects each IP data package of the downstream incoming IP data package stream to the correct port of different ports or collects data packages from the different ports for further transmission upstream on a channel, such as a constant bite rate (CBR) channel. In this embodiment, the ports are LAN Ports for connection to different end devices 14 such as data terminals, PCs, Video equipment, Television set Digital set Top box, etc.

In this embodiment, one of the LAN ports is connected to a gateway for providing ports for IP-telephony, POTS and ISDN BRA.

The switching means 22 may be characterised as an ATM-switch or an Ethernet Layer 2 switch offering connection oriented service having no possibility to give selective priority, like precedence, to different IP data packages by monitoring of RTCP reports. Quality of Support (QoS) on IP-level layer 3 is therefore not provided for.

According to the invention, an adaptive QoS means (AQS) 24 is integrated in the network for providing such a feature. The system comprises computer means for controlling the switching means 22. The computer means comprises at least one processing unit that is connected to storage means for storing software computer program products and data. The computer means also involve necessary In-and-Out means (I/O). The adaptive QoS means can be implemented as a computer program software that is integrated in the system and the switching means by downloading and storing said software in a program storage of the computing means and run by the processing unit.

The AQS means 24 comprises mainly monitoring means 28, controlling means 30 and filtering means 32.

The monitoring means 28 comprises a first acquisition means 34a for acquisition of a bandwidth value TB of the total IP data throughput and first comparing means 36a for comparing the total IP data throughput value TB to a minimum value m. Further, the AQS means 24 comprises second acquisition means 34b for acquisition of the Quality of service information carried in the RTP/RTCP data packages, and second comparing means 36b for comparing the Quality of service information, containing at least one QoS value $Q_n$, carried in the RTP/RTCP data packages, to a corresponding QoS acceptance ratio. In general, the function of the monitoring means is to identify, detect, compare and check, in other words monitoring parameters of the total IP data throughput.

At the transport layer, the Real Time Transport Protocol (RTP) is used to transport multimedia traffic on the Internet or IP based network. RTP consists of two parts, a data part and a control part. Continuous media data, like audio or video, is carried in RTP data packets. RTP has been designed within the Internet Engineering Task Force (IETF). RTP is an end-to-end protocol.

RTP offers a control protocol called RTCP that supports the protocol functionality. Applications having recently sent real time media streams with RTP audio or video data generate a sender report and a receiving end device 14, like a user terminal, is obliged to return a receiver report. Such reports or acknowledgements are not provided for in UDP traffic, for instance voice. The adaptive QoS means 24 is based on the acquiring and analysis of the RTP-header fields in the packages received on the RTP port and the content of the RTCP Reports received at the RTCP port.

The second acquisition means 34b either reads the values for packages loss $Q_1$, optional jitter $Q_2$ and delay $Q_3$ from each report if possible, or reads the QoS information and calculates/determines corresponding values for packages loss $Q_1$, optional jitter $Q_2$ and delay $Q_3$. These values are then used in a second comparing means 36b, which operation will be explained in more detail below.

The means of the monitoring means 28 activates or deactivates the filter controlling means 30 and the filtering means 32.

The minimum value m may be possible to configure to be equal or less than the limit GMB of the restricted bandwidth of a channel, such as an ATM defined Constant Bite Rate (CBR) provided by the WAN access network or defined for a Virtual Channel. The minimum value m is possible to define in the interval [0, M], wherein M is the maximum value that may be equal to the maximum capable throughput bandwidth of the RTP/RTCP based traffic and none RTP/RTCP based traffic possible over the switch based aggregation device or end device before first device to reach saturation If the actual used total IP throughput bandwidth value TB exceeds the minimum value m, that the second acquisition means 34b for acquisition of the Quality of Service information carried in the RTP/RTCP data packages is activated. If a predefined level of packages loss, optional jitter or delay are detected, the filter controlling means 30 and the filtering means 32 are activated.

If the actual used throughput is below the minimum value m, first comparing means 34a shall disable the filtering means 32 as well as the filter controlling means 30. By defining the minimum guaranteed bandwidth GMB to zero the second acquisition means 34b will be active continuously independently of IP data throughput TB.

Depending on configurable filter criteria in the controlling means 30 for controlling said filtering means, the filtering means is capable of filtering adaptively among the total IP data throughput depending on port, MAC-address, IP-address, session-ID or other criteria. The AQS means 24 are configurable and adaptive by means of said criteria. It may also work as a standard application Firewall or likewise.

The filtering means may discard all or a part of the traffic that is not RTP/RTCP related traffic or other type of high priority data traffic like H.323 signalling according to the.

The switch based aggregation system has a number of ports, each connected either to a corresponding LAN port that is connectable to separate end devices or other ports, such as POTS, etc. The controlling means 30 is designed to control the filtering means 32. The data traffic stream will flow undisturbed through the filter 32 in an opened mode, but there will be no traffic a closed mode. Only the traffic allowed to pass according to the filter criteria will let through.

The filter controlling means 30 can operate in two modes:
a first mode, Simple mode, when only one of the QoS values is found to be not acceptable; or
a second mode, Advanced mode, when all QoS values are found to be not acceptable.

When packages loss, optional jitter and delay are detected to be within an acceptable range, the filtering means 32 shall be disabled by the controlling means 30.

In order to avoid any instability in the filter controlling means 30 of the AQS means, a filter deactivation threshold value $F_d$ is defined. $F_d$ may be predefined as the available throughput buffer level (see FIGS. 7a, 7b). Another stability measure is to program the controlling means 30 to deactivate the filtering means a predefined expiration time period t from the time point when the declining of the minimum value was detected.

The AQS is connected logically and/or physically to at least one aggregation device, like a switch. There has to be a minimum guaranteed IP-data throughput flow in the network. There also has to be devices, like gateways, and end devices, such those exemplified above, that generates RTP/RTCP-packets.

The acquiring means 34 of the monitoring means 28 provides the network with the necessary tool for reading, recording and/or registering the QoS information carried by the sender and receiving reports and, when necessary, calculate the different QoS values $Q_n$. FIGS. 3a and 3b are illustrations of a RTP/RTCP-packet sender report and a RTP/RTCP-packet receiver report, respectively. Each sender report is intended for and addressed to a special end device. The end device responds with a receiver report to the sender.

An RTP message consists of a number of "stackable" packets, each with its own type code and length indication. Their format is fairly similar to data packets; in particular, the type indication is at the same location. Thus, they also serve as a liveness indicator of session members, even in absence of transmitting media data.

RTCP packets contain the necessary information for Quality-of-Service (QoS) monitoring. They contain information on the highest sequence number received, the number of packets lost, a measure of the interarrival jitter and timestamps needed to compute an estimate of the round-trip delay between sender and the receiver issuing the report.

FIG. 3b illustrates a Receiver Report that could be used. The receiving end applications deliver receiver reports to the source. The reports include information that enables the calculation of packet losses, packet delay and jitter. There are two reasons for packet loss: packets get lost due to buffer overflow or to bit errors. The probability of bit errors is very low on most networks. It is already considered in the TCP protocol that loss is rather induced by congestion than by bit errors. Buffer overflow can happen on a congested link or at the network interface of the end device.

FIG. 3b shows the different data fields and their relative position in a RTCP receiver report. The most interesting fields is the "Fraction Lost", "Cumulative # of Packets Lost", "Interarrival Jitter" and "Delay Since Last SR (Sender Report)". These fields provide possibility to determine the Quality of Service.

The Adaptive QoS means 24 comprising monitoring means 28 for monitoring the total IP data throughput on the switch based aggregation system, the filtering means 32 being capable of filtering the total IP data throughput and the controlling means 30 for controlling said filtering means 32 depending on the monitoring of the total IP data throughput on the switch based aggregation system and filter criteria, all means and filter criteria may be implemented as software program and computer readable code stored on a computer readable product or in a computer readable storage for processing in a specialised computer, server, personal computer, Digital Processor, Central Processing Unit, etc.

As illustrated in FIG. 2, the computer program may be loaded to the AQS 24 from a server 38 as a FTP (general File Transfer Protocol) file transfer, TFTP (Trivial File Transfer Protocol) or other transfer protocol suitable for computer program transfer. A Management Platform 40 may remotely control the AQS means 24 and the Switch Based Aggregation system 12 and configure the AQS means 24 with jitter ratio, Packet (Packages) Loss ratio, Packages delay, filter method, filter criteria, activation upstreams and/or downstreams.

Figure 4:
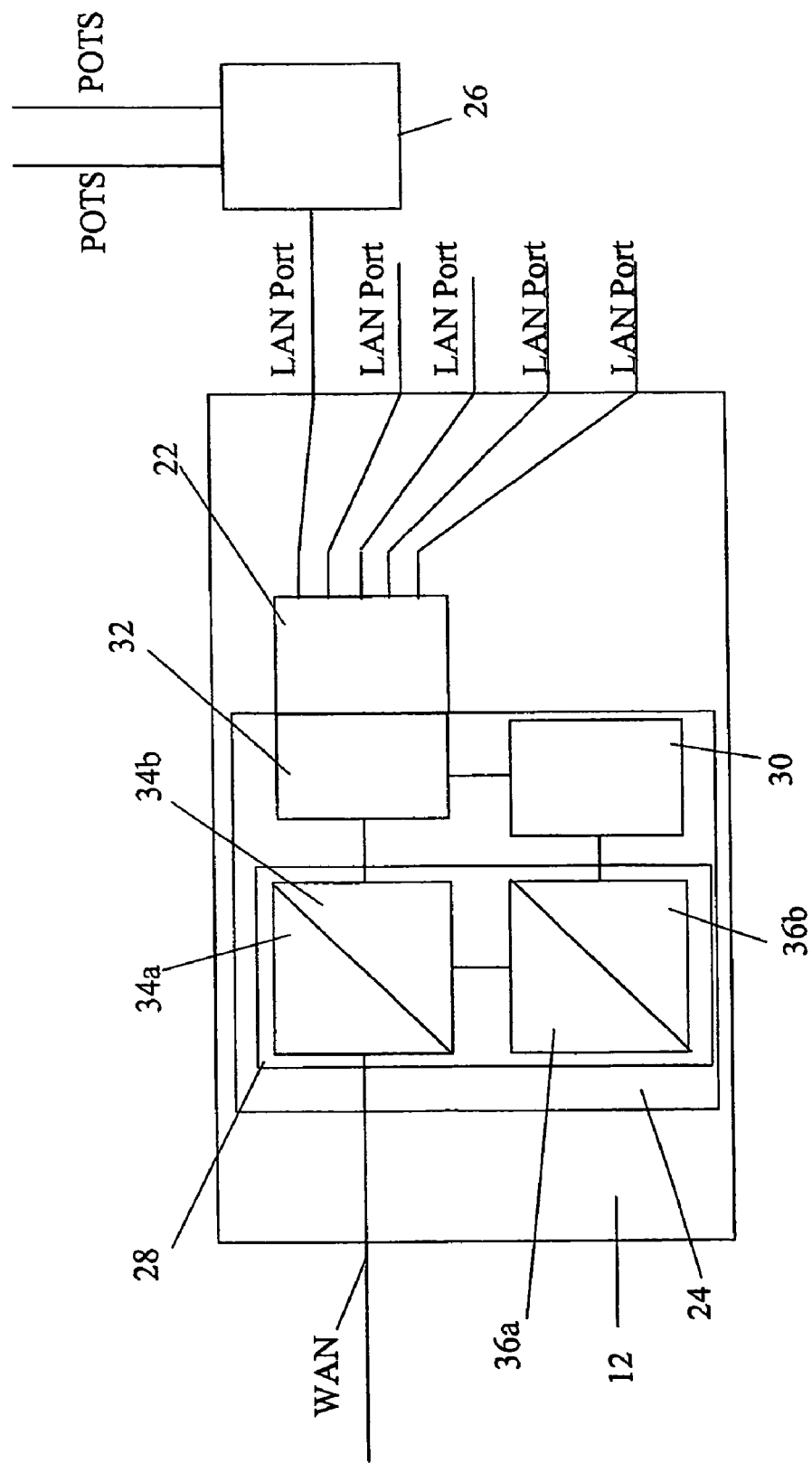
FIG. 4 shows a second embodiment of a switch based aggregation device.

FIG. 4 shows a second embodiment of a switch based aggregation system. This embodiment is similar to the embodiment illustrated in FIG. 2. The only difference is that the gateway is situated outside the switch based aggregation device. The gateway is connected to one of the LAN ports of the switch based aggregation device. The invented AQS means will operate as earlier described above.

In the above described embodiments of the invention, the monitoring means 28 for monitoring the total IP data throughput on the switch based aggregation system, the filtering means 32 being capable of filtering the total IP data throughput and the controlling means 30 for controlling said filtering means 32 depending on the monitoring of the total IP data throughput on the switch based aggregation system 12 and filter criteria are gathered in an Adaptive QoS means AQS 24. However, it is also possible to distribute the different means of the AQS in the network. For instance, the monitoring means may be moved and connected to a higher level of a hierarchic network. It is necessary to use a communication link and a suitable protocol for the communication of information, signalling and interaction between the monitoring means 28 and the controlling and filtering means 30, 32. It is also possible to place the AQS separated from the switching means but logically connected, for instance by means of a suitable protocol.

Another aspect of the present invention is a method that in the following will be described in more detail with reference to FIGS. 5 and 6.

This is a method for providing Quality of Service (QoS) to an Ethernet switching means connected to a Wide Area Network (WAN), which has at least one bandwidth limited channel. In said channel, a total IP data throughput stream of voice-, video- and/or other real time applications or services together with none real time applications or services are provided by use of IP data packages. The Ethernet switching means is logically connected to an Adaptive Quality of Service (AQS) means. The method comprises following steps:

acquisition of the Quality of service information carried in the RTP/RTCP data packages of the IP data throughput stream, step 110, 126;

comparing at least one QoS value $Q_n$, each $Q_n$ is based on the Quality of service information from the RTP/RTCP data packages, to a corresponding QoS acceptance ratio, step 112, 128;

filtering when at least one QoS value has an unacceptable level to said corresponding QoS acceptance ratio, step 114, 130.

The method also comprises following steps:

acquisition of a value TB of the used bandwidth of the total IP data throughput, step 102, 122;

comparing the value TB of the used bandwidth of total IP data throughput to a minimum value m, step 104, 104;

acquisition of the Quality of service information carried in the RTP/RTCP data packages, step 110, 126, if the total data throughput exceeds the minimum value m.

The acquisition of QoS-values may be performed by reading the passing RTP/RTCP reports of voice-, video- and/or other real time applications or services. The QoS-values may be packages loss ratio, jitter ratio and/or maximum delay, which may be compared to the corresponding QoS acceptance ratio. The QoS-values is provided by acquiring and analysing the RTP-header fields of the downwards packages and the content of the RTCP Sender Report and/or Receiver Report on the WAN.

The filtering is stopped, either if the total IP throughput declines a deactivation threshold value $F_d$ or, if at least one of the QoS values $Q_n$ is acceptable, step 116, 132.

The method also comprises control of the filtering means according to configurable filter criteria, causing the filtering means to be capable of filtering adaptively among the total IP data throughput depending on port, MAC-address, IP-address, session-ID or other criteria.

The controlling means may be set in either of two operation modes:
- a first mode—Simple mode—when only one of the QoS values is found to be not acceptable, or
- a second mode—Advanced mode—when all QoS values are found to be not acceptable.

The deactivation threshold value $F_d$ may be set as a predefined available throughput buffer level. The filter deactivation threshold value $F_d$ may also be configured to be equal to or less than the minimum value m, which is a positive number. The minimum value m may be configured to be equal to or less than the guaranteed minimum bandwidth (GMB) of the WAN.

For better stability of the system, a predefined time period (t) from the time point when the declining of the minimum value was detected may expire before deactivating the filtering process.

An embodiment of the invented method will now be described with reference to FIG. 5. This method comprise mainly four method loops of steps: loop Ia, loop Ib, loop II and loop III. The AQS will therefore operate in three states: monitoring state (corresponds to loop Ia and loop Ib), receiver report monitoring state (corresponds to loop II) and filtering state (corresponds to loop III).

The method starts, step 100, and the AQS begins to monitor the total data throughput TB, step 102. This information representing the used bandwidth is provided from the first acquisition means 34a. The present bandwidth value TB is compared to the minimum value m, step 104. If TB doesn't exceed the minimum value m, than in step 106 the AQS will check if the filtering means is active. If the filtering means is active, the filtering means will be deactivated in step 108 of loop Ia. If the filtering means is deactivated or after the filtering means has been deactivated in step 108, the monitoring of data throughput continues, step 102. As long as the bandwidth value TB doesn't exceed the minimum value m, the method and the AQS will remain in a first loop Ib and first monitoring state.

Figure 5:
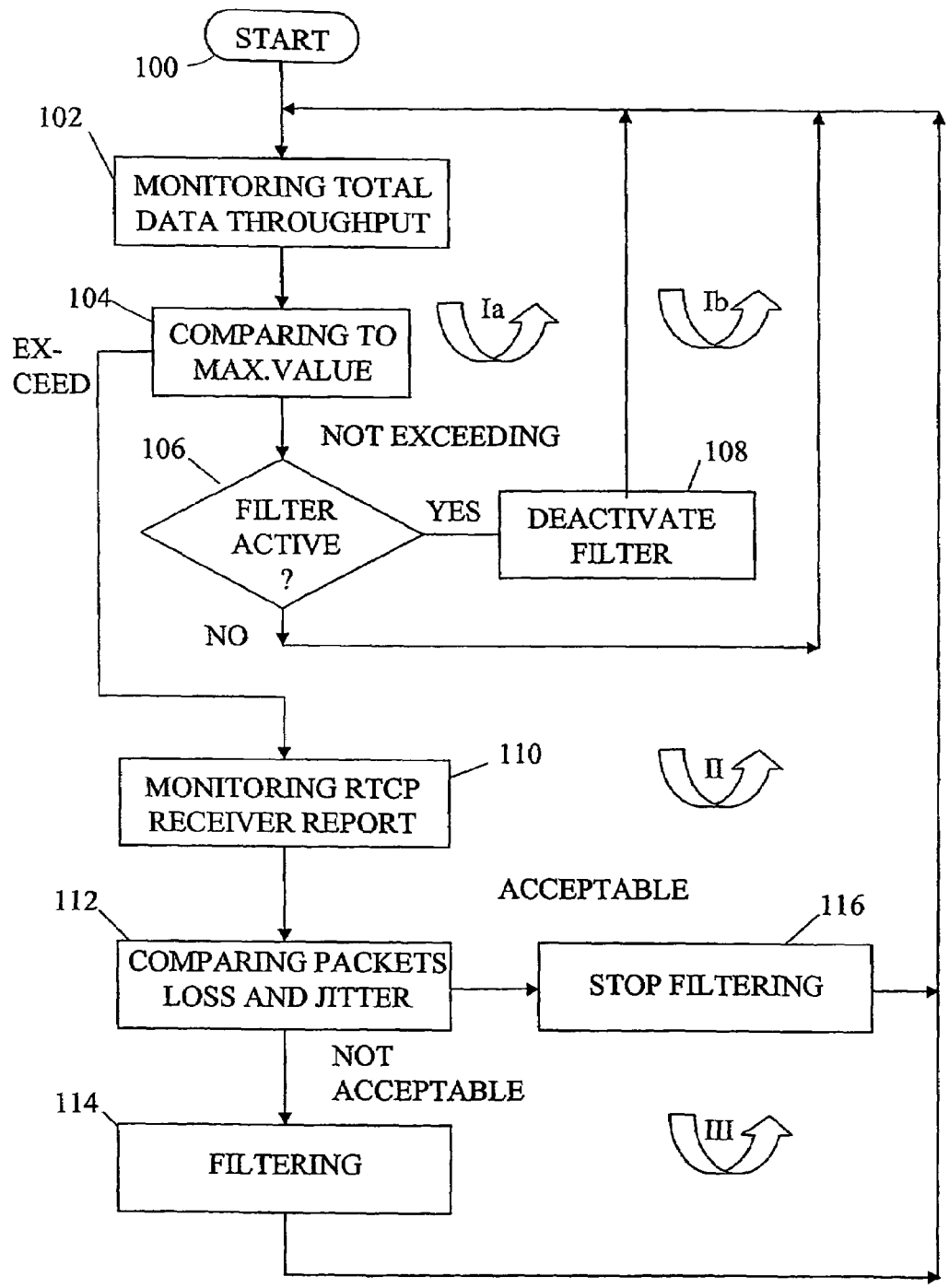
FIG. 5 shows a flow chart of an embodiment of the invented method.

If the total data throughput value TB exceeds the minimum value m, the receiver report is monitored, as illustrated in step 110 of the flowchart in FIG. 5. According to this described embodiment of the method, a new loop of steps is entered and the state of the AQS is changed. The values of Packets Loss, Package Delay and Jitter are read from the header of each received receiver report. Said values are compared to different acceptance criteria in step 112. If any of these values is not acceptable, filtering is necessary and the filtering means is activated in step 114, if it is not already active. Therefore, the AQS enters the third state, also recalled as the filtering state or state III, as the method enters and runs the third loop, the filtering loop, loop III. The AQS will remain in this state as long as any of the packets loss value, delay or jitter value or all values are found to be not acceptable and the total data throughput value TB exceeds the minimum value m.

If all the packets loss value, delay or jitter value are found to be acceptable, but the total data throughput value TB still exceeds the minimum value m, the AQS changes from the filtering state to the second state, the receiver report monitoring state. The filtering means will be deactivated in step 116.

If the filtering means is active, step 114, or after the filtering means has been deactivated in step 116, the monitoring of data throughput continues, step 102.

As soon as the total data throughput value TB doesn't exceed the minimum value m, the AQS will return to the monitoring state. If the filter is active, which is checked in step 106, it is deactivated in step 108 of loop Ia. Then the AQS will operate according to the steps of loop Ib.

Another embodiment of the invented method will now be described with reference to FIG. 6. This method comprises mainly three method loops of steps: loop I, loop II and loop III. An AQS will operate in three states: monitoring state (corresponds to loop I), receiver report monitoring state (corresponds to loop II) and filtering state (corresponds to loop III).

The method starts, step 120, and the AQS begins to monitor the total data throughput TB, step 122. This information representing the used bandwidth is provided from the first acquisition means 34a. The present bandwidth value is compared to the minimum value m of the data throughput window, step 124. As long as the bandwidth value TB doesn't exceed the minimum value m, the monitoring of the total data throughput continues with step 102, and the method and the AQS will remain in a first loop I and first monitoring state.

Figure 6:
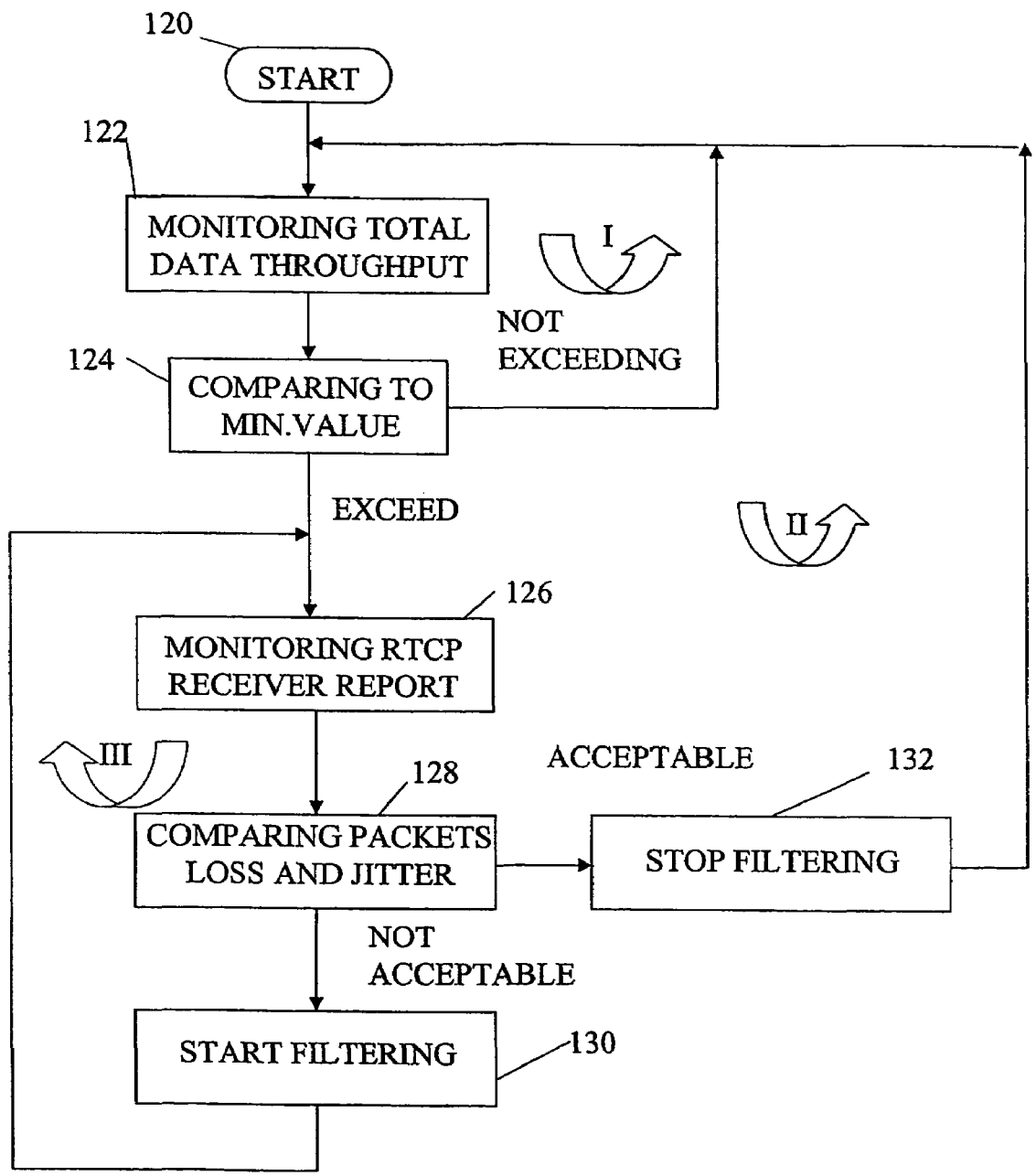
FIG. 6 shows a flow chart of another embodiment of the invented method.

If the total data throughput value TB exceeds the minimum value m, the receiver report is monitored, as illustrated by step 126 of the flowchart in FIG. 6. According to this described embodiment of the method, a new loop of steps is entered and the state of the AQS 24 is changed. The values of Packets Loss, Delay and Jitter are read from the header of each received receiver report in step 126. Said values are compared to different acceptance criteria in step 128. If any of these values is not acceptable, filtering is necessary and the filtering means is activated in step 130, if it is not already active. Therefore, the AQS enters the third state, also recalled as the filtering state or state III, as the method enters step 126 and runs the third loop, the filtering loop. The AQS will remain in this state as long as any of the packets loss value, delay value or jitter value or all values are found to be not acceptable.

If all the packets loss value, delay or jitter value are found to be acceptable, but the total data throughput value TB still exceeds the minimum value m, the AQS changes from the filtering state to the second state, the receiver report monitoring state. If the filter is active, which is checked in step 128, it is deactivated in step 132 of loop II, before operating step 122, the monitoring of the total data throughput. Then the AQS will operate according to the steps of loop II, the second state.

When the total data throughput value TB doesn't exceed the minimum value m, the AQS will return to the monitoring state and the steps of loop I. But it is also possible that any of the monitored values is not acceptable during the second state, and therefore filtering is necessary. The filtering means is activated in step 130 and again the AQS enters the filtering state, state III.

The described embodiments are only examples of how an AQS may operate according to the invention. An AQS may be implemented in many different ways within the scoop of the invention and the examples shall not be regarded as limitations of the scoop.

The invention also relates to a computer program product directly loadable into an memory storage of a processing unit within the computer means, comprising the software code means for performing the steps of the claimed method.

The computer program product can be stored on a computer usable medium, comprising readable program for causing a processing unit in a computer means to control an execution of the steps of any of the claimed method.

The method is implemented by means of a computer program product comprising the software code means for performing the steps of the method. The processing unit of the computer means runs the computer program product. The computer program product is loaded directly or indirectly from a computer usable medium, such as a floppy disc, a CD, ROM, PROM, EEPROM, or the Internet.

Figure 7A:
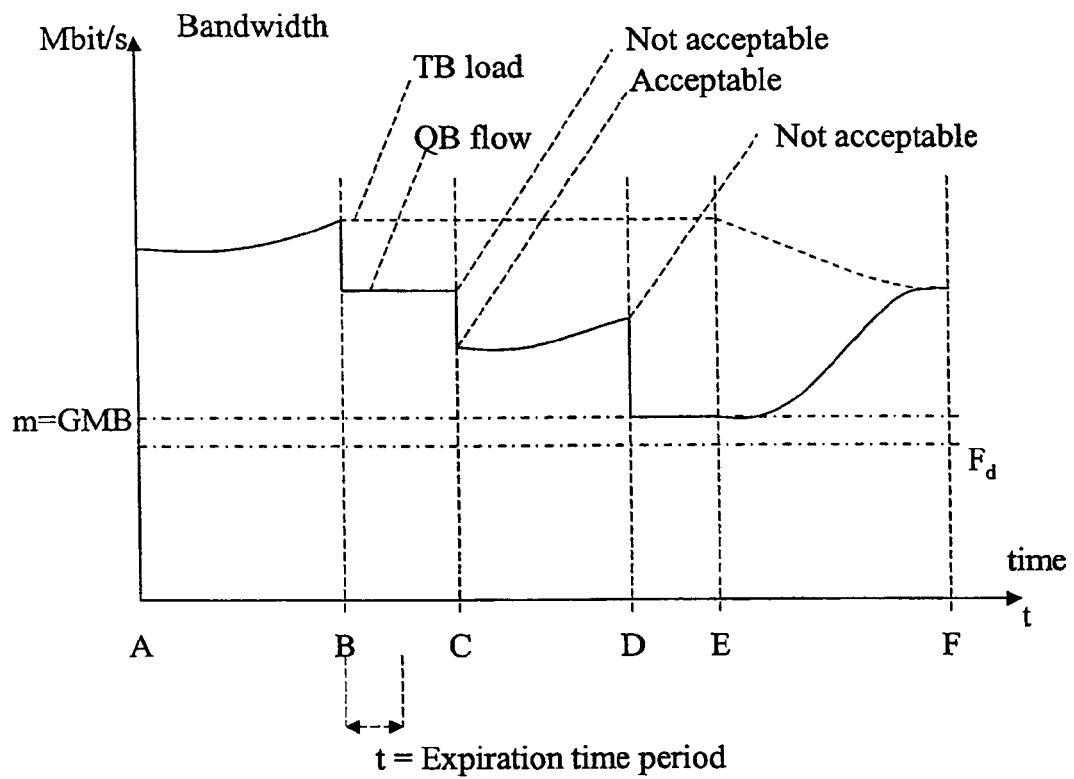
FIG. 7a is a diagram illustrating the operation of a AQS means as a function of a hypothetical signal and traffic load over the switch based aggregation device during a time interval A-F.

In FIG. 7a, the operation of the AQS means is illustrated as a function of a hypothetical signal and traffic load over the switch based aggregation system during a time interval A-F. The abscissa axis of the diagram is a time axis and the ordinate axis is denoted bandwidth in Mbit/s. Two curves are drawn for illustrating this hypothetical case. One of the curves, TB load, is the Total bandwidth requirement of a traffic load over time through the switch based aggregation system and the second curve, QB flow, is the throughput bandwidth for the same traffic load over time after passing the filter. A Guaranteed Minimum Bandwidth GMB is also indicated as a first horizontal dashed line in the diagram. In order to avoid any instability in the controlling means 30, a predefined filter deactivation threshold value $F_d$ (lower horizontal dashed line in FIG. 7a) or a predefined expiration time period t is used as additional criteria before the filtering means 32 are disabled.

During interval A-B there is a small increase in the signal and package traffic load. The filter 32 is disabled as there is no indication of any package loss in the received RTCP packages and the QB flow is equivalent to the TB load, as indicated in FIG. 7a. At time point B one received RTCP report indicates a packages loss ratio of, for instance, 10% and the filtering control enables the QoS filter, which will scan the total traffic through the device for services that is not a real time service. One of the package flows at one of the ports or package flow belonging to one MAC-address, IP-address, session-ID or similar is temporarily decreased or totally stopped depending on a predetermined filter criteria resulting in that the QB flow will decrease. During interval B-C the package loss is acceptable and neither decreasing nor improving and the QB flow is constant. However, at time point C a new RTCP report indicates increased package loss, which is not acceptable according to the predetermined packages loss criteria and further scanning and filtering is necessary resulting in less, but acceptable, QB flow into or out of the SBA device, as indicated at C.

During the C-D interval a slight improvement of the package loss is measured and the QB flow may rise.

At time point D, a new RTCP report is received indicating great package loss rates. Therefore, all QB flow is decreased to the guaranteed GMB level. Data package transfer over this level is temporarily not allowed. When the traffic situation in the network is reported to be improved at time point E, the QB flow is allowed to increase up to TB load as long as the package loss figures are increasing or acceptable. Full transfer of signalling and data packages is reached at time point F.

Figure 7B:
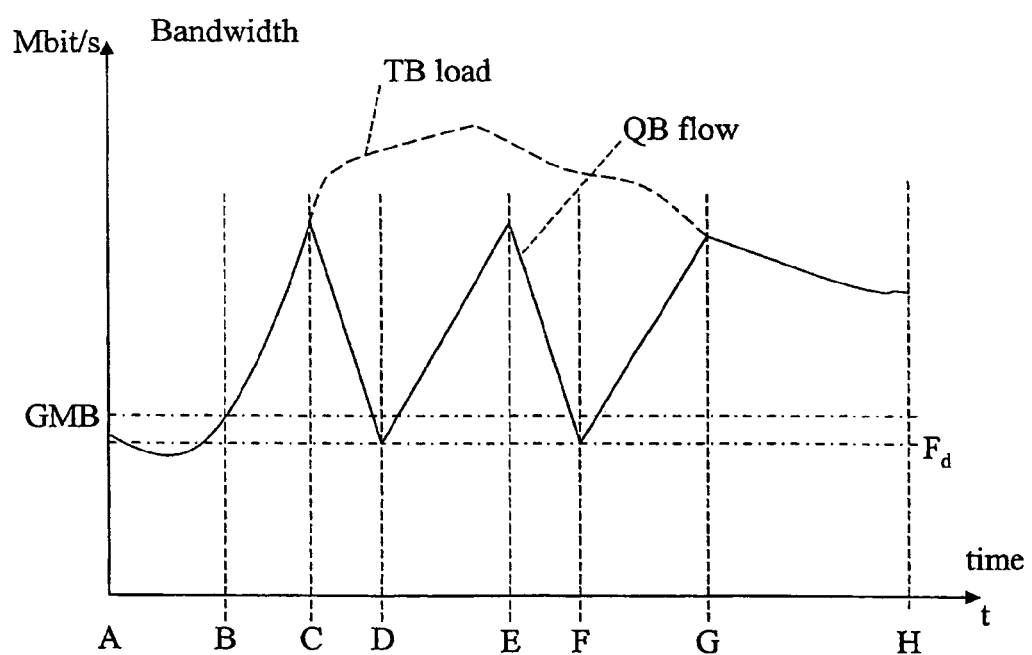
FIG. 7b is a diagram illustrating the operation of a different operating AQS means as a function of a hypothetical signal and traffic load over the switch based aggregation device during a time interval A-H.

The example above in FIG. 7a. shows soft control by the filter controlling means. FIG. 7b illustrates a tough control by the controlling means.

In FIG. 7b, the operation of a second AQS means is illustrated as a function of a hypothetical signal and traffic load over the switch based aggregation system during a time interval A-H. The abscissa axis of the diagram is a time axis and the ordinate axis is denoted bandwidth in Mbit/s. Two curves are drawn for illustrating this hypothetical case. One of the curves, TB load, is the Total bandwidth requirement of a traffic load over time through the switch based aggregation system and the second curve, QB flow, is the throughput bandwidth for the same traffic load over time after passing the filter. A guaranteed minimum bandwidth GMB is also indicated as a horizontal line in the diagram.

During interval A-B there is a small increase in the signal and package traffic load TB. The filter is not active as the QB flow does not exceed GMB and the QB flow is equivalent to the TB load, as indicated in FIG. 7b. The first acquisition means 34a for acquisition of the used bandwidth of the total IP data throughput, step 102; 122, and the first comparing means 36a for comparing the used bandwidth of the total IP data throughput to a minimum value m, step 104; 104, in this case the guaranteed minimum bandwidth value GMB. At time point B the TB load exceeds the GMB level and the second acquisition means 34b of the monitoring means 28 starts the acquisition of the Quality of service information, containing at least one QoS value, carried in the RTP/RTCP data packages, step 110; 126, and the second comparing means 36b for comparing each QoS value $Q_n$ to a corresponding QoS acceptance ratio, step 112; 128, are activated and running. As long as there is no indication of any package loss, jitter or delay in the received RTCP reports, the filtering means and process is not activated.

At time point C, one received RTCP report indicates not acceptable package loss, e.g. package loss 10%. Therefore, at least one QoS value has an unacceptable level relatively said corresponding QoS acceptance ratio and the filtering control enables the QoS filter, step 114, 130. The filtering means 32 will scan the total IP-based throughput for services that is not a real time service. The UDP package flows of at least one of the switch based aggregation system LAN ports is temporarily totally stopped depending on a predetermined priority rule resulting in that the admitted QB flow will decrease rapidly. Therefore, all QB flow is decreased to the filter deactivation threshold value $F_d$, closely below the guaranteed GMB level. The filtering means is therefore deactivated at time point D and the QB flow may rise again. During the C-D interval, an improvement of the package loss is measured. The traffic situation in the network is monitored and is measured to be improved and acceptable.

At time point E, one received RTCP report indicates, e.g. delay 6%. Therefore, at least one QoS value has an unacceptable level relatively said corresponding QoS acceptance ratio and the filtering control enables the QoS filter, step 114, 130. The process and course of events described for interval C-E will be repeated for the interval E-G.

At time point G, the QB flow is allowed to increase up to TB load, because the $Q_n$ values are found to be within an acceptable range or ratio. Full transfer of signalling and data packages is reached at time point G.

The present invention is not limited to the above-described preferred embodiments. Various alternatives, modifications and equivalents may be used. Therefore, the above embodiments should not be taken as limiting the scope of the invention, which is defined by the appended claims.

The invention claimed is:

1. A method for providing Quality of Service (QoS) to an Ethernet switching means connected to a Wide Area Network (WAN), which has at least one bandwidth limited channel, wherein a total IP data throughput of voice-, video- and/or other real time applications or services together with non-real time applications or services are provided by use of IP data packages, wherein the Ethernet switching means is logically connected to an Adaptive Quality of Service (AQS) means, comprising the steps of:

acquiring Quality of Service information carried in the RTP/RTCP data packages;

comparing at least one QoS value $Q_n$ to a corresponding QoS acceptance ratio, wherein each $Q_n$ is based on the Quality of Service information from the RTP/RTCP data packages;

filtering when at least one QoS value has an unacceptable level to said corresponding QoS acceptance ratio;

acquiring a value (TB) for the instantaneous used bandwidth of the total IP data throughput;

comparing the used bandwidth value (TB) of the total IP data throughput to a minimum value m;

acquiring the Quality of service information carried in the RTP/RTCP data packages, if the total data throughput exceeds the minimum value m.

2. A method for providing Quality of Service (QoS) to an Ethernet switching means connected to a Wide Area Network (WAN), which has at least one bandwidth limited channel, wherein a total IP data throughput of voice-, video- and/or other real time applications or services together with non-real time applications or services are provided by use of IP data packages, wherein the Ethernet switching means is logically connected to an Adaptive Quality of Service (AQS) means, comprising the steps of:

acquiring Quality of Service information carried in the RTP/RTCP data packages;

comparing at least one QoS value $Q_n$ to a corresponding QoS acceptance ratio, wherein each $Q_n$ is based on the Quality of Service information from the RTP/RTCP data packages;

filtering when at least one QoS value has an unacceptable level to said corresponding QoS acceptance ratio;

wherein the filtering is stopped, if a used bandwidth value (TB) of the total IP throughput declines a deactivation threshold value $(F_d)$; and wherein the deactivation threshold value $(F_d)$ is a predefined value available throughput buffer level.

3. A method for providing Quality of Service (QoS) to an Ethernet switching means connected to a Wide Area Network (WAN), which has at least one bandwidth limited channel, wherein a total IP data throughput of voice-, video- and/or other real time applications or services together with non-real time applications or services are provided by use of IP data packages, wherein the Ethernet switching means is logically connected to an Adaptive Quality of Service (AQS) means, comprising the steps of:

acquiring Quality of Service information carried in the RTP/RTCP data packages;

comparing at least one QoS value $Q_n$ to a corresponding QoS acceptance ratio, wherein each $Q_n$ is based on the Quality of Service information from the RTP/RTCP data packages;

filtering when at least one QoS value has an unacceptable level to said corresponding QoS acceptance ratio;

further comprising the steps of setting a controlling means in either of two operation modes;

a first mode—Simple mode—when at least one of the QoS values is found to be not acceptable, and a second mode—Advanced mode—when all QoS values are found to be not acceptable.

4. The method according to claim 1, wherein the minimum value (m) is configured to be equal to or less than the guaranteed minimum bandwidth (GMB) of the WAN.

5. The method according to claim 1, further comprising the step of acquiring and analysing the QoS information of the RTP-header fields of the downwards packages and the QoS information of the RTCP Sender Report and/or Receiver Report on the WAN.

6. A computer program product having computer readable program code stored on a computer useable medium for providing Quality of Service (QoS) to an Ethernet switching means that is connected to a Wide Area Network (WAN), which has at least one bandwidth limited channel, wherein a total IP data throughput of voice-, video- and/or other real time or services together with non-realtime applications or services are provided by use of IP data packages, wherein the Ethernet switching means is logically connected to an Adaptive Quality of Service (AQS) means, the computer readable program code comprises code for;

acquiring Quality of Service information carried in the RTP/RTCP data packages;

comparing at least one QoS value $Q_n$ to a corresponding QoS acceptance ratio wherein each $Q_n$ is based on the Quality of Service information from the RTP/RTCP data packages;

filtering when at least one QoS value has an unacceptable level to said corresponding QoS acceptance ratio;

acquiring a value (TB) for the instantaneous used bandwidth of the total IP data throughput;

comparing the used bandwidth value (TB) of the total IP data throughput to a minimum value m;

acquiring the Quality of service information carried in the RTP/RTCP data packages, if the total data throughput exceeds the minimum value m.

7. A computer program product having computer readable program code stored on a computer useable medium for providing Quality of Service (QoS) to an Ethernet switching means that is connected to a Wide Area Network (WAN), which has at least one bandwidth limited channel, wherein a total IP data throughput of voice-, video- and/or other real time applications or services together with non-realtime applications or services are provided by use of IP data packages, wherein the Ethernet switching means is logically connected to an Adaptive Quality of Service (AQS) means, the computer readable program code comprises code for:

acquiring Quality of Service information carried in the RTP/RTCP data packages;

comparing at least one QoS value $Q_n$ to a corresponding QoS acceptance ratio, wherein each $Q_n$ is based on the Quality of Service information from the RTP/RTCP data packages;

filtering when at least one QoS value has an unacceptable level to said corresponding QoS acceptance ratio;

wherein the filtering is stopped, if a used bandwidth value (TB) of the total IP throughput declines a deactivation threshold value $(F_d)$; and wherein the deactivation threshold value $(F_d)$ is a predefined value available throughput buffer level.

8. A computer program product having computer readable program code stored on a computer useable medium for providing Quality of Service (QoS) to an Ethernet switching means that is connected to a Wide Area Network (WAN), which has at least one bandwidth limited channel, wherein a total IP data throughput of voice-, video- and/or other real time applications or services together with non-realtime applications or services are provided by use of IP data packages, wherein the Ethernet switching means is logically connected to an Adaptive Quality of Service (AQS) means, the computer readable program code comprises code for:

acquiring Quality of Service information carried in the RTP/RTCP data packages;

comparing at least one QoS value $Q_n$ to a corresponding QoS acceptance ratio, wherein each $Q_n$ is based on the Quality of Service information from the RTP/RTCP data packages;

filtering when at least one QoS value has an unacceptable level to said corresponding QoS acceptance ratio;

further comprising program code for setting a controlling means in either of two operation modes:

a first mode—Simple mode—when at least one of the QoS values is found to be not acceptable, and a second mode—Advanced mode—when all QoS values are found to be not acceptable.

9. The computer program product of claim 6 wherein the minimum value (m) is configured to be equal to or less than the guaranteed minimum bandwidth (GMB) of the WAN.

10. The computer program product of claim 6 further comprising program code for acquiring and analysing the QoS information of the RTP-header fields of the downwards packages and the QoS information of the RTCP Sender Report and/or Receiver Report on the WAN.

* * * * *